(12) United States Patent
Newstadt et al.

(10) Patent No.: US 10,049,190 B1
(45) Date of Patent: Aug. 14, 2018

(54) METHOD AND APPARATUS FOR REMOTELY MANAGING A RESOURCE AT A COMPUTER

(75) Inventors: Keith Newstadt, Newton, MA (US); Shaun Cooley, El Segundo, CA (US); Sourabh Satish, Fremont, CA (US); Timothy G. Brown, Fort Edward, NY (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 2073 days.

(21) Appl. No.: 12/004,579

(22) Filed: Dec. 21, 2007

(51) Int. Cl.
*G06F 21/00* (2013.01)
*G06F 21/10* (2013.01)

(52) U.S. Cl.
CPC .................................. *G06F 21/10* (2013.01)

(58) Field of Classification Search
CPC ....................................................... G06F 21/10
USPC ......................................................... 705/59
See application file for complete search history.

(56) References Cited

U.S. PATENT DOCUMENTS

| | | | |
|---|---|---|---|
| 5,671,412 A * | 9/1997 | Christiano | |
| 5,742,829 A * | 4/1998 | Davis | G06F 8/61 717/178 |
| 6,195,678 B1 * | 2/2001 | Komuro | G06F 8/61 709/202 |
| 6,360,334 B1 * | 3/2002 | Kavanagh | G06F 8/61 707/999.006 |
| 6,510,513 B1 * | 1/2003 | Danieli | G06F 21/64 380/279 |
| 6,574,612 B1 * | 6/2003 | Baratti et al. | 705/59 |
| 6,681,323 B1 * | 1/2004 | Fontanesi | G06F 8/60 710/10 |
| 7,065,507 B2 * | 6/2006 | Mohammed et al. | 705/59 |
| 7,171,662 B1 * | 1/2007 | Misra | G06Q 30/06 705/59 |
| 7,197,466 B1 * | 3/2007 | Peterson et al. | 705/59 |
| 7,266,731 B2 * | 9/2007 | Ali-Santosa et al. | 714/42 |
| 7,337,147 B2 * | 2/2008 | Chen et al. | 705/59 |
| 7,581,217 B2 * | 8/2009 | Jhanwar | G06F 8/65 717/168 |
| 7,636,693 B2 | 12/2009 | Faur et al. | |
| 7,752,138 B1 * | 7/2010 | Dean | G06Q 20/382 705/50 |
| 7,752,139 B2 * | 7/2010 | Hu | 705/59 |
| 7,797,678 B2 | 9/2010 | Moulckers et al. | |
| 7,840,490 B1 * | 11/2010 | Sellers | G06F 21/105 705/59 |

(Continued)

OTHER PUBLICATIONS

Ron White, How Computers Work, Sep. 1999, Que Corporation, Millennium Ed., p. 1-421.*

(Continued)

*Primary Examiner* — Alexis Casey
(74) *Attorney, Agent, or Firm* — Rory D. Rankin; Meyertons, Hood, Kivlin, Kowert & Goetzel, P.C.

(57) ABSTRACT

A method and apparatus for using a remote delegate is described. In one embodiment, the method comprising evaluating information that identifies at least one of software packages resident in a client computer or licenses associated with the software packages using a remote delegate and enabling use of a resource at the client computer based on the information through use of the remote delegate.

13 Claims, 4 Drawing Sheets

(56) References Cited

U.S. PATENT DOCUMENTS

| | | | |
|---|---|---|---|
| 7,949,608 B2* | 5/2011 | Li | G06Q 30/02 705/51 |
| 8,660,961 B2 | 2/2014 | Raley et al. | |
| 2001/0034712 A1* | 10/2001 | Colvin | G06F 21/121 705/52 |
| 2002/0091645 A1* | 7/2002 | Tohyama | 705/59 |
| 2002/0107809 A1* | 8/2002 | Biddle et al. | 705/59 |
| 2002/0138441 A1* | 9/2002 | Lopatic | G06F 21/125 705/59 |
| 2002/0161718 A1* | 10/2002 | Coley et al. | 705/59 |
| 2002/0164025 A1* | 11/2002 | Raiz | G06F 21/10 380/231 |
| 2003/0028488 A1* | 2/2003 | Mohammed | G06F 21/10 705/59 |
| 2003/0061136 A1* | 3/2003 | Inoue | G06F 21/105 705/35 |
| 2003/0088516 A1* | 5/2003 | Remer | G06F 21/12 705/59 |
| 2003/0126135 A1* | 7/2003 | Gaxiola | H04L 12/2805 |
| 2003/0135756 A1* | 7/2003 | Verma | G06F 21/10 726/27 |
| 2003/0220880 A1* | 11/2003 | Lao et al. | 705/51 |
| 2004/0003269 A1* | 1/2004 | Waxman | G06F 21/10 713/193 |
| 2004/0015857 A1* | 1/2004 | Cornelius et al. | 717/120 |
| 2004/0260748 A1* | 12/2004 | Springer, Sr. | G06F 9/505 709/200 |
| 2004/0267590 A1* | 12/2004 | Clark et al. | 705/9 |
| 2005/0004873 A1* | 1/2005 | Pou et al. | 705/51 |
| 2005/0240985 A1* | 10/2005 | Alkove | G06F 21/10 726/1 |
| 2005/0289072 A1* | 12/2005 | Sabharwal | 705/59 |
| 2006/0053080 A1* | 3/2006 | Edmonson | G06F 21/10 705/59 |
| 2006/0179058 A1* | 8/2006 | Bram et al. | 707/9 |
| 2006/0265337 A1* | 11/2006 | Wesinger, Jr. | 705/65 |
| 2007/0005504 A1* | 1/2007 | Chen et al. | 705/59 |
| 2007/0066282 A1* | 3/2007 | Roman | H04L 67/104 455/412.1 |
| 2007/0100768 A1* | 5/2007 | Boccon-Gibod et al. | 705/59 |
| 2007/0107067 A1* | 5/2007 | Fountian | G06F 8/60 726/33 |
| 2007/0198427 A1* | 8/2007 | Vajjiravel et al. | 705/59 |
| 2007/0198428 A1* | 8/2007 | Satkunanathan et al. | 705/59 |
| 2007/0244823 A1* | 10/2007 | Motley et al. | 705/59 |
| 2008/0083040 A1* | 4/2008 | Dani | H04L 63/0807 726/28 |
| 2008/0162360 A1* | 7/2008 | Bantz | G06F 21/105 705/59 |
| 2008/0215474 A1* | 9/2008 | Graham | G06Q 10/10 705/37 |
| 2008/0235141 A1* | 9/2008 | Hilerio | G06F 21/105 705/59 |
| 2008/0256349 A1* | 10/2008 | Dennis et al. | 713/1 |

OTHER PUBLICATIONS

Korzeniowski, Paul. "When Licensing c/s Software, One Size does Not Fit all." Software Magazine, vol. 14, No. 6, 1994, pp. 73-77.*

* cited by examiner

METHOD AND APPARATUS FOR REMOTELY MANAGING A RESOURCE AT A COMPUTER

BACKGROUND OF THE INVENTION

Field of the Invention

Embodiments of the present invention generally relate to computer resource management and, more particularly, to a method and apparatus for remotely managing a resource at a computer.

Description of the Related Art

Today, a computer has become a basic necessity, and used in all aspects of modern life, for example, electronic communication, business applications, and the like. Such applications are facilitated by software packages developed for storage and execution on the computer.

For a user to operate a software package, the user needs to acquire and install the software package as well as acquire a license to use the software package. The software package may be downloaded or purchased on a medium (e.g., CD, DVD, and the like). The software package is usually associated with a software serial number assigned by the software vendor/owner. Typically, a license (e.g., an agreement to use the software package) is purchased and executed (signed or otherwise acknowledged accepted of the license terms).

Most users are not familiar with the installation process, configuration and license management of various software packages. As a result, users may fail to renew the licenses before such licenses expire. Without a current license, the user is not provided with software updates. Without such updates, the software package may not function properly. To receive assistance with license and update management, software producers send reminder mail and/or email, push updates to the user, provide help desks and so on. All such techniques require time-consuming and error-prone interaction with users.

Accordingly, there is a need in the art for a method and apparatus for remotely managing a resource at a computer such that software acquisition, licensing, installation and the like are performed by a remote delegate.

SUMMARY OF THE INVENTION

Embodiments of the present invention comprise a method and apparatus for remote administration of a client computer. In one embodiment, a method comprising evaluating information identifying software packages resident in a client computer and licenses associated with the software packages. A remote delegate enables use of a resource at the client computer based on the information gathered from the client computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
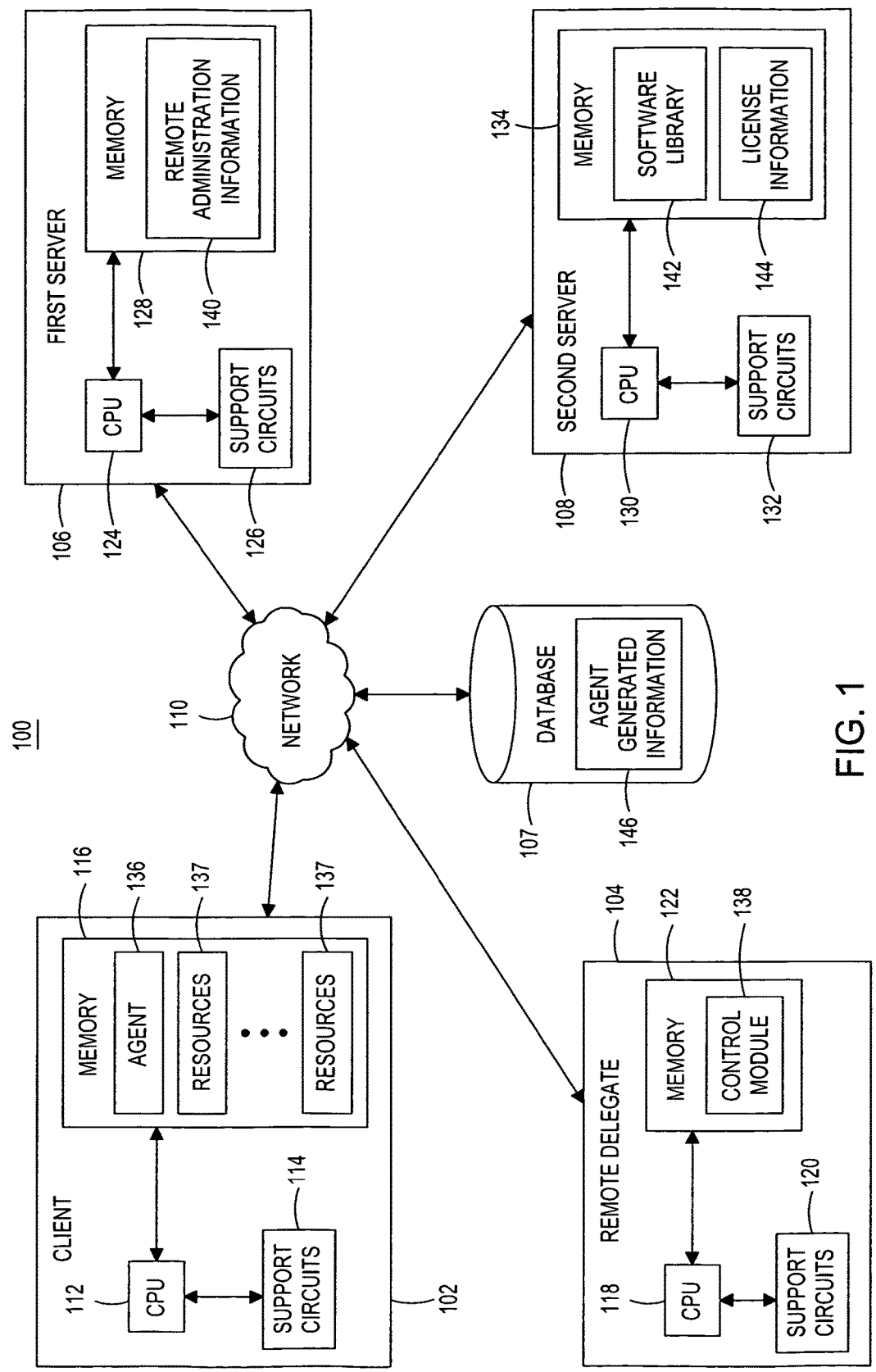
FIG. 1 is a block diagram of a system for remotely controlling the administration of a client computer in accordance with one or more embodiments of the present invention.

FIG. 1 is a block diagram of a system 100 for remotely controlling the administration of a client computer. The system 100 includes a client computer 102, a remote delegate 104, a first server 106, a database 107 and a second server 108, each coupled to each other through a network 110.

The network 110 comprises a communication system that connects a computer system by wire, cable, fiber optic and/or wireless link facilitated by various types of well-known network elements, such as hubs, switches, routers, and the like. The network 110 may employ various well-known protocols to communicate information amongst the network resources. For example, the network 110 may be a part of the internet or intranet using various communications infrastructure such as Ethernet, WiFi, WiMax, General Packet Radio Service (GPRS), and the like.

In one embodiment, the first server 106 is a web server for a community management web site, as described below. In another embodiment, the system 100 comprises a software purchasing server and a software management server instead of the second server 108, as described below. For the purpose of simplicity, the software management server and the software purchasing server are combined to form the second server 108 in the following description.

The client computer 102 is any form of computing device. The client computer 102 comprises a central processing unit (CPU) 112, various support circuits 114, and a memory 116. The CPU 112 may comprise one or more commercially available microprocessors or microcontrollers that facilitate data processing and storage. The various support circuits 114 facilitate the operation of the CPU 112 and comprise at least one of clock circuits, power supplies, cache, input/output circuits, and the like. The memory 116 comprises at least one of read only memory (ROM), random access memory (RAM), disk drive storage, optical storage, removable storage, and the like. The memory 116 includes an agent 136 and various resources 137

The term "resource", as used herein, refers to any physical or virtual component of availability within a computer system. Every computing entity connected to a computer system is, potentially, a resource. Every internal system component is a resource. Every software package stored in a memory is a resource. Resources also include files, virtual block devices, network connections, applications, processes, memory areas and the like. In its broadest sense, a resource is a component (whether physical or virtual) that facilitates the operation of the computing system for its intended purpose.

The first server 106 comprises a central processing unit (CPU) 124, support circuits 126 and a memory 128. The CPU 124 may comprise one or more commercially available microprocessors or microcontrollers that facilitate data processing and storage. The various support circuits 126 facilitate operation of the CPU 124 and comprise at least one of clock circuits, power supplies, cache, input/output circuits, and the like. The memory 128 comprises at least one of read only memory (ROM), random access memory (RAM), disk drive storage, optical storage, removable storage, and the like. The memory 128 includes various data such as remote administration information 140.

In one or more embodiments, the first server 106 may be a web server that hosts the community management web site. The community management web site installs the client agent 136 on the client computer 102. The community management web site also allows the user to designate and authorize the remote delegate 104 to acquire resources, such as software packages and licenses, on behalf of the user of the client computer 102. In one embodiment, the user may authorize the remote delegate 104 to manage installation of any of the acquired resources (e.g., software packages). The community management web site maintains the remote administration information 140, which specifies the remote delegate is responsible for remotely administrating a particular client computer. For example, the remote administration information 140 indicates that the remote delegate 104 is responsible for remotely managing the various resources 137 (e.g., software applications) at the client computer 102. Alternatively, the user searches a plurality of remote delegates using the community management web site, selects the remote delegate 104 and stores the selection in the remote administration information 140.

The database 107 comprises a structured collection of various information, such as agent generated information 146. The database 107 is configured to receive and store the agent generated information 146 from the agent 136, as explained below. The database 107 is further configured to enable search and retrieval of the agent generated information 146 for the remote delegate 104, the first server 106 and/or the second server 108.

The remote delegate 104 is a computing device comprising a central processing unit (CPU) 118, various support circuits 120, and a memory 122. The CPU 118 may comprise one or more commercially available microprocessors or microcontrollers that facilitate data processing and storage. The various support circuits 120 facilitate operation of the CPU 118 and comprise at least one of clock circuits, power supplies, cache, input/output circuits, and the like. The memory 122 comprises at least one of read only memory (ROM), random access memory (RAM), disk drive storage, optical storage, removable storage, and the like. The memory 122 includes various software packages, such as a control module 138.

The second server 108 comprises a central processing unit (CPU) 130, various support circuits 132, and a memory 134. The CPU 130 may comprise one or more commercially available microprocessors or microcontrollers that facilitate data processing and storage. The various support circuits 132 facilitate operation of the CPU 130 and comprise at least one of clock circuits, power supplies, cache, input/output circuits, and the like. The memory 134 comprises at least one of read only memory (ROM), random access memory (RAM), disk drive storage, optical storage, removable storage, and the like. The memory 134 includes a software library 142. The memory 134 includes various information, such as license information 144.

The software library 142 comprises a plurality of software packages available for acquisition by the user of the client computer 102. The license information 144 indicates one or more licenses associated with each of the plurality of software packages that are available for acquisition by the user of the client computer 102. The license information 144 may be in a form of a table that reflects that the client computer 102 acquired one or more licenses associated with a particular software package.

The term "license", as used herein, refers to an agreement to use the software package. A license may be executed between the second server 108 and the remote delegate 104 on behalf of the user of the client computer 102. The license defines the terms (e.g., price, duration, scope of use and the like) under which the user may utilize the software package. The license is indexed according to a software serial number generated by a software vendor. Generally software licenses are not "physically" communicated to the user because they are, essentially, intangible rights to use the software package. Occasionally, billing information, the software serial number and/or an activation/confirmation code may be communicated to the user.

In one or more embodiments, the second server 108 provides purchasing and licensing services to the user of the client computer 102 and the remote delegate 104. These services are associated with the software library 142 stored within the second server 108 and/or any third party software. As mentioned above, the software library 142 may be stored in a separate server (e.g., the software management server). In one embodiment, the second server 108 may notify the agent 136 of software packages and/or licenses acquired by the remote delegate 104. In one embodiment, the agent 136 automatically downloads the software packages upon the notification from the second server 108. In another embodiment, the agent 136 automatically executes or agrees to execute the licenses. Alternatively, the user may decide to decline the recommended software packages and/or licenses in which case the acquisition orchestrated by the remote delegate 104 is reversed (e.g., the user is refunded any money used to acquire the software packages and/or licenses).

In another embodiment, the second server 108 may also be a web server for a software management web site. In this embodiment, the remote delegate 104 interacts with the second server 108 through the software management web site to remotely acquire (e.g., purchase) the software packages and/or licenses on behalf of the user of the client computer 102. Furthermore, the remote delegate 104 accesses the agent generated information 146 through the software management website.

The agent 136 on the client computer 102 provides information regarding to various software packages resident on the client computer 102. The information identifies various software packages at the client computer 102 and licenses associated with the various software packages. In one embodiment, information also includes the client computer 102 resource parameters, for example, available bandwidth, storage space, processing power and the like. In another embodiment, the information also includes usage history of each of the various software packages, reported problem history from trouble tickets, cost comparison information, and the like. The information may also include version and/or expiration information associated with each of the identified software packages and licenses. The information is reported to the database 107 via the network 110, where the information is stored as the agent generated information 146. Alternatively, the information is reported to the second server (e.g., the software management website).

In operation, the remote delegate 104 controls the acquisition of one or more software packages and/or management of one or more licenses associated with the client computer 102. In one embodiment, the control module 138 accesses the agent generated information 146 stored in the database 107 and evaluates the software packages and/or licenses identified in the agent generated information 146. Based on the evaluation, the remote delegate 102 enables access to and/or use of any of the various resources 137 at the client computer 102 for the user. In another embodiment, the remote delegate 104 determines which software package and/or license to recommend to the user of the client computer 102. In yet another embodiment, the control module 138 determines which software packages are to be acquired (e.g., automatically purchased) and/or licenses are to be acquired (e.g., automatically purchased, renewed or brokered) on behalf of the user. In this embodiment, the remote delegate 104 is authorized by the user to complete the acquisition process using information associated with the user (e.g., billing information, contact/delivery information and the like). Furthermore, in other embodiments of the present invention, the remote delegate 104 may remotely control the installation process of the acquired software packages on the client computer 102 on behalf of the user. In addition, the remote delegate 104 may schedule or delay the installation process. For example, the remote delegate 104 may schedule the installation process at a time when the client computer 102 is idle and/or online. As another example, the remote delegate 104 may delay the installation process if the client computer 102 is in use and/or offline.

Optionally, the remote delegate 104 may broker a dynamic license in accordance with a desired use of any of the various resources 137 (e.g., software packages resident on the client computer or recommended for acquisition). For example, the user may wish to scan the memory 116 for viruses, but the user cannot afford the cost of purchasing an anti-virus application and a license to use the anti-virus application and/or download updates. The user, however, can afford to purchase a license to use the anti-virus application for only one scan or one day, but such a license is not available for purchase (e.g., not indicated in the license information 144). Accordingly, the remote delegate 104 negotiates the dynamic license with the second server 108 where the user can use the anti-virus application for one scan or one day.

Optionally, the remote delegate 104 may determine an appropriate acquisition method for one or more software packages at the client computer 102. For example, the remote delegate 104 may observe that the client computer 102 has a very slow internet connection (e.g., small amount of available bandwidth) from the resource parameters within the agent generated information 146. Accordingly, the user will experience an exorbitant amount of difficulty in downloading a 4 Gigabyte software package from the software library 142. In fact, such a task may take days to complete. Moreover, the unknowledgeable user may inadvertently cause disruptions in the download process. Hence, in one embodiment, the remote delegate 104 determines that mailing the 4 Gigabyte software package in the form of DVDs is more efficient and/or less prone to the problems that may befall the unknowledgeable user. Moreover, the remote delegate 104 is configured to remotely control the installation process as the user inserts each DVD. Alternatively, the second server 108 may provision the 4 Gigabyte software package on a network shared volume that the remote delegate 104 could mount.

Figure 2:
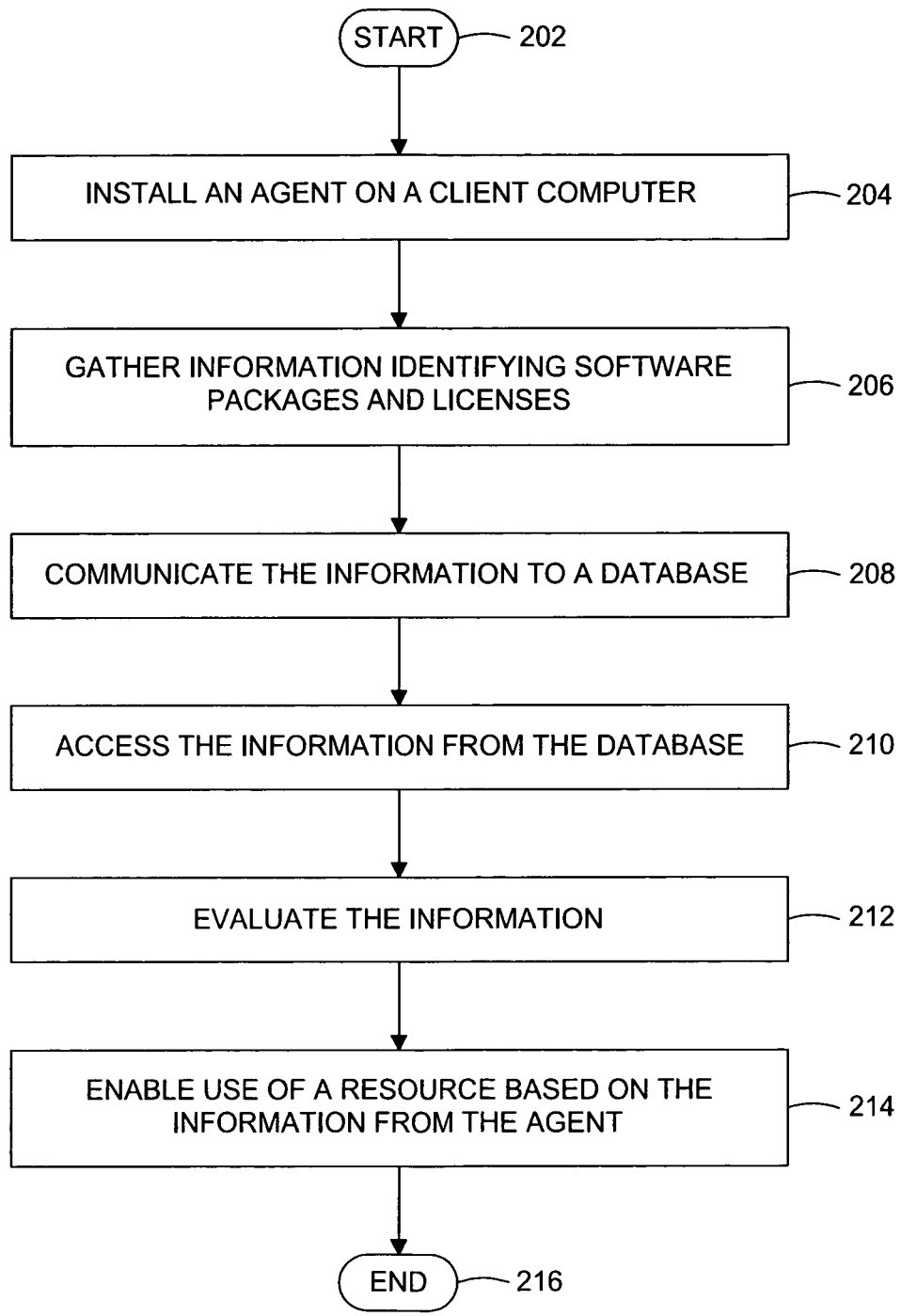
FIG. 2 is a flow diagram of a method for remotely controlling the administration of a client computer, in accordance with one or more embodiments of the present invention.

FIG. 2 illustrates a method 200 for using the remote delegate 104, according to one embodiment of the present invention. The method has been explained with reference to the system 100 of FIG. 1.

The method 200 starts at step 202 and proceeds to step 204, at which the agent 136 is installed into the memory 116 of the client computer 102. Installation is performed by the first server 106 once the user designates the remote delegate 104 for remote administration of the client computer 102. In one embodiment, the user of the client computer 102 authorizes the remote delegate 104 to act as their remote administrator via the community management web site hosted by the first server 106.

At step 206, the agent 136 on the client computer 102 gathers the information identifying various software packages that reside in the memory 116 and/or licenses associated with the various software packages (e.g., the agent generated information 146). In one embodiment, the gathered information includes license expiration and version information associated with the identified software packages as well as various resource parameters (e.g., storage capacity, processing power, available bandwidth, and the like). At step 208, the agent 136 communicates the gathered information to the database 107. In one embodiment, the gathered information is stored as the agent generated information 146. At step 210, the gathered information is accessed. In one embodiment, the agent generated information 146 is accessed from the database 107. At step 212, the gathered information is evaluated. At step 214, use of any of the various resources 137 is enabled based on the evaluation of the agent generated information 146 as explained above. The step 214 is discussed further with respect to FIG. 3 and FIG. 4. The method 200 ends at step 216.

Figure 3:
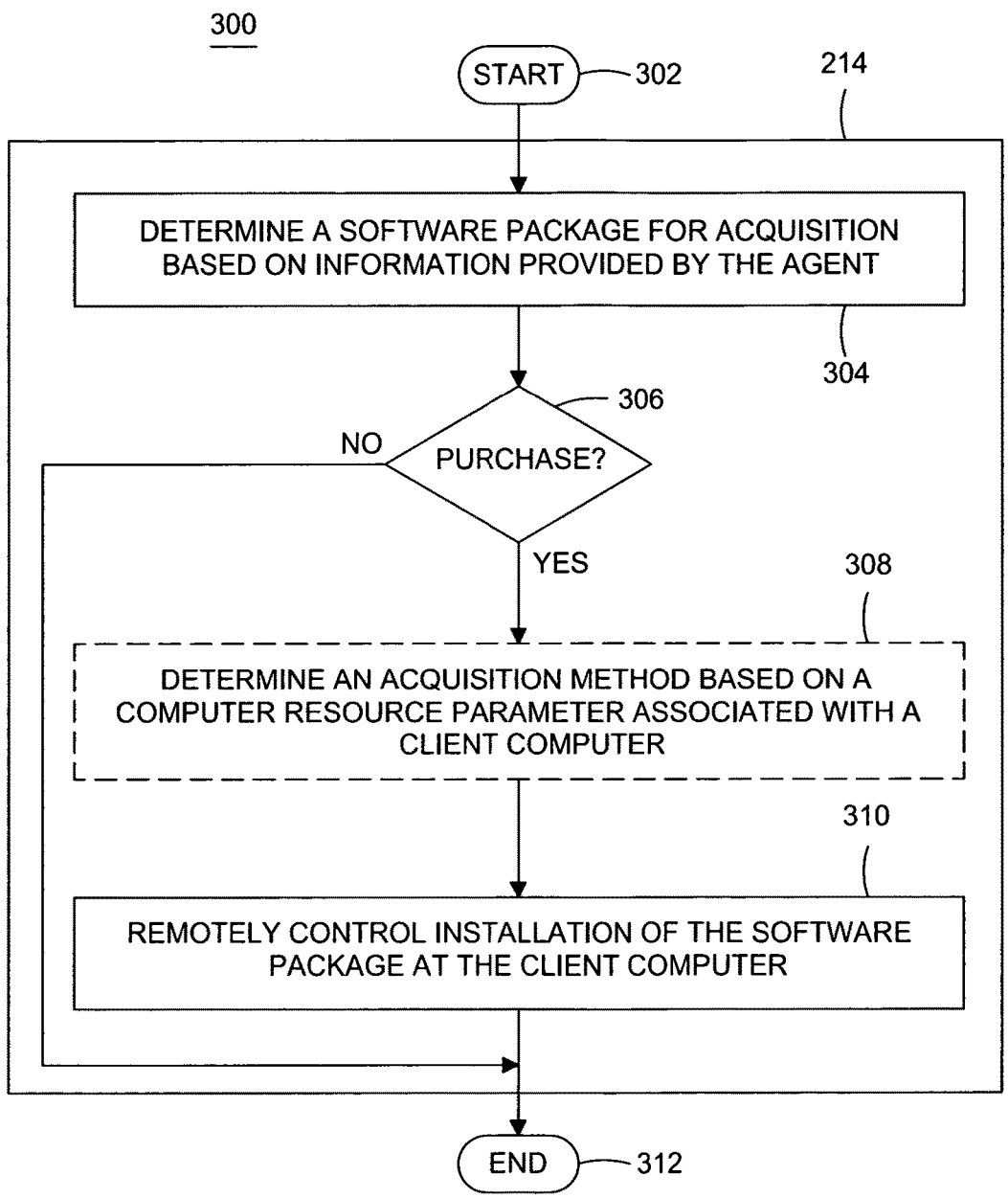
FIG. 3 is a flow diagram of a method of determining of a software package to acquire on behalf of a client computer, according to one or more embodiments of the present invention.

FIG. 3 illustrates a method 300 of determining a software package to acquire on behalf of the client computer 102, according to one or more embodiments. The method 300 starts at step 302 and proceeds to step 304, at which the remote delegate 104 determines the software package for acquisition based on the information provided by the agent 136 (e.g., agent generated information 146).

At step 306, a determination is made as to whether a software package is to be purchased. If one or more software package is to be purchased (option "YES"), the method 300 proceeds to step 310 or to optional step 308. At optional step 308, the remote delegate 104 determines an acquisition method based on the agent generated information 146, as described above. At step 310, the remote delegate 104 remotely controls the installation process of the software package at the client computer 102. As mentioned above, if the remote delegate 104 determines that mailing the determined software package in the form of the DVDs is the most efficient acquisition method, the remote delegate 104 remotely controls each step of the installation process as the user inserts each DVD. If, at step 306 it is determined that software package is not to be purchased (option "NO") then the method 300 proceeds to step 312. The method 300 ends at step 312.

Figure 4:
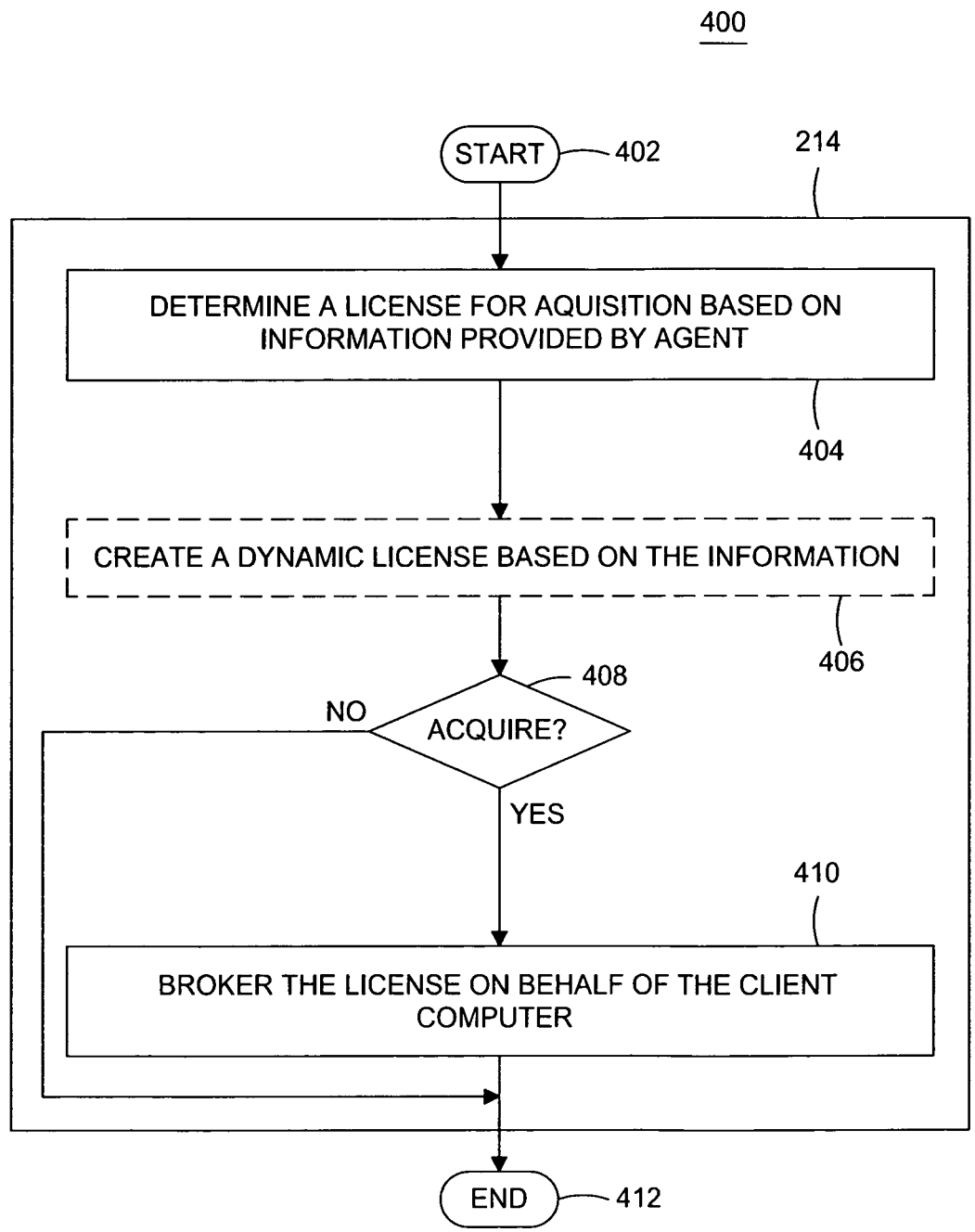
FIG. 4 is a flow diagram of a method of determining a license to acquire on behalf of a client computer, according to one or more embodiments of the present invention.

FIG. 4 illustrates a method 400 of determining a license to acquire on behalf of the user of the client computer 102, according to one or more embodiments. The method 400 starts at step 402 and proceeds to step 404, at which the remote delegate 104 determines a license for acquisition based on the information provided by the agent 136 (e.g., agent generated information 146) on behalf of the user of the client computer 102. After step 404, the method 400 proceeds to step 408 or optional step 406.

At optional step 406, the remote delegate 104 creates a dynamic license based on the agent generated information 146, as explained above. At step 408, a determination is made as to whether the user desires to acquire the license. If the license is to be acquired (option "YES") then the method 400 proceeds to step 410. At step 410, the remote delegate 104 brokers the license on behalf of the user of the client computer 102. In the case of the dynamic license, the remote delegate 104 negotiates terms suggested by the agent generated information 146 include instructions from the user at the step 410. As described above, the remote delegate 104 is authorized to complete the acquisition of the licensing (e.g., execute a license agreement) using sensitive information provided by the user (e.g., billing information, contact information and the like). If, at step 408 it is determined that the license is not to be acquired (option "NO") then the method 400 proceeds to step 412. The method 400 ends at step 412.

While the foregoing is directed to embodiments of the present invention, other and further embodiments of the invention may be devised without departing from the basic scope thereof, and the scope thereof is determined by the claims that follow.

The invention claimed is:

1. A computer-based method comprising:
maintaining in memory, via a processor communicatively coupled to a network, a database of software license information indicating software packages available for purchase from a plurality of third-party vendors;
receiving, via the network, authorization from a remote client computer to acquire at least one software package available for purchase from a first third-party vendor;
receiving, via the network, information generated by an agent executing on the remote client computer, wherein the information includes an indication of valid licenses associated with the remote client computer and resource parameters of the remote client computer including at least one of available bandwidth, storage space, or processing power;
identifying, via the processor, a software package to acquire on behalf of the remote client computer;
sending, via the processor over the network, the software package to the remote client computer;
brokering, via the processor over the network, a dynamic license for the software package from the first third-party vendor on behalf of the remote client computer, wherein the brokering comprises automatically negotiating terms of the dynamic license that are different from terms of licenses available for purchase for the software package, wherein first terms of the dynamic license differ from second terms of the software license information in the database;
sending, via the processor over the network, an electronic payment on behalf of the remote client computer to a server of the first third-party vendor for the dynamic license; and
enabling, via the processor over the network, use of the software package at the remote client computer using the dynamic license;
wherein enabling use of the software package further comprises controlling, via the processor over the network, installation of the software package on the remote client computer and installing the software package on the remote client computer; and
wherein brokering the dynamic license further comprises creating, via the processor, the dynamic license associated with the software package based on at least one of a software history, a usage history, and an instruction associated with the remote client computer.

2. The method of claim 1, wherein brokering the dynamic license further comprises controlling, via the processor over the network, acquisition of the dynamic license from the server on behalf of the remote client computer.

3. The method of claim 1, wherein enabling use of the software package further comprises initiating, via the processor over the network, installation of the software package on the remote client computer.

4. The method of claim 1, further comprising managing, via the processor, software license information on behalf of the remote client computer, wherein the software license information is associated with the software package.

5. The method of claim 1, wherein enabling use of the software package further comprises:
receiving, via the network, a plurality of resource parameters from the remote client computer; and
determining, via the processor, an acquisition method for the software package based on the plurality of resource parameters from the remote client computer.

6. The method of claim 1, wherein identifying the software package further comprises recommending, via the processor over the network, the software package for installation on the remote client computer based on at least one of a software history, a usage history, and at least one instruction associated with the remote client computer.

7. An apparatus comprising:
at least one non-transitory processor readable storage medium storing a computer program of instructions configured to:
maintain in memory a database of software license information indicating software packages available for purchase from a plurality of third-party vendors;
receive authorization from a remote client computer to acquire at least one software package available for purchase from a first third-party vendor;
receive, via a network, information generated by an agent executing on the remote client computer, wherein the information includes an indication of valid licenses associated with the remote client computer and resource parameters of the remote client computer including at least one of available bandwidth, storage space, or processing power;
identify a software package to acquire on behalf of the remote client computer;
send the software package to the remote client computer;
broker a dynamic license for the software package from the first third-party vendor on behalf of the remote client computer, wherein the brokering comprises automatically negotiating terms of the dynamic license that are different from terms of licenses available for purchase for the software package, wherein first terms of the dynamic license differ from second terms of the software license information in the database;
send an electronic payment on behalf of the remote client computer to a server of the first third-party vendor for the dynamic license; and
enable use of the software package at the remote client computer using the dynamic license;
wherein enabling use of the software package further comprises controlling, via the processor over the network, installation of the software package on the remote client computer and installing the software package on the remote client computer; and wherein brokering the dynamic license further comprises creating, via the processor, the dynamic license associated with the software package based on at least one of a software history, a usage history, and an instruction associated with the remote client computer.

8. The apparatus of claim 7, further configured to determine an acquisition method for the software package based on a plurality of resource parameters from the remote client computer.

9. The apparatus of claim 7, further configured to control installation of the software package on the remote client computer.

10. A system for remotely managing a computer resource, comprising:

a memory; and at least one processor communicatively coupled to a network, wherein the at least one processor is configured to:

maintain in the memory a database of software license information indicating software packages available for purchase from a plurality of third-party vendors;

receive an authorized request for a software package available for purchase from a first third-party vendor from a remote client device over the network;

receive, via the network, information generated by an agent executing on the remote client device, wherein the information includes an indication of valid licenses associated with the remote client device and resource parameters of the remote client computer including at least one of available bandwidth, storage space, or processing power;

analyze the database to determine that the remote client device requires a license from the first third-party vendor to enable the software package for use on the remote client device;

broker a dynamic license for the software package from the first third-party vendor on behalf of the remote client computer, wherein the brokering comprises automatically negotiating terms of the dynamic license that are different from terms of licenses available for purchase for the software package, wherein first terms of the automatically negotiated license differ from second terms of the software license information in the database;

send an electronic payment over the network on behalf of the remote client device to a server of the first third-party vendor for the dynamic license;

enable the software package of the third-party vendor over the network for use on the remote client device with the automatically negotiated license;

wherein enabling use of the software package further comprises controlling, via the processor over the network, installation of the software package on the remote client computer and installing the software package on the remote client computer; and wherein brokering the dynamic license further comprises creating, via the processor, the dynamic license associated with the software package based on at least one of a software history, a usage history, and an instruction associated with the remote client computer.

11. The system of claim 10, wherein the dynamic license is based on a licensing option selected from among a plurality of licensing options received from the first third-party vendor, and wherein selection of the licensing option is based at least in part on system resource information received from the remote client device.

12. The system of claim 10, wherein the dynamic license is based on a custom licensing request not included among a plurality of licensing options received from the first third-party vendor, wherein customization of the custom licensing request is based at least in part on at least one licensing parameter received from the remote client device.

13. The system of claim 10, wherein enable the software package further comprises remotely controlling installation of the software package on the remote client device over the network.

* * * * *